United States Patent
Crump

(10) Patent No.: US 10,608,836 B2
(45) Date of Patent: Mar. 31, 2020

(54) TAILORING THE AVAILABILITY OF NETWORK RESOURCES TO ON-DEMAND, USER PROXIMITY, AND SCHEDULE TIME

(71) Applicant: MobileM2M Incorporated, Cedar Rapids, IA (US)

(72) Inventor: Bernie Crump, Cedar Rapids, IA (US)

(73) Assignee: MobileM2M Incorporated, Cedar Rapids, IA (US)

( * ) Notice: Subject to any disclaimer, the term of this patent is extended or adjusted under 35 U.S.C. 154(b) by 0 days.

(21) Appl. No.: 16/364,692

(22) Filed: Mar. 26, 2019

(65) Prior Publication Data

US 2019/0312748 A1 Oct. 10, 2019

Related U.S. Application Data

(60) Provisional application No. 62/654,612, filed on Apr. 9, 2018.

(51) Int. Cl.
*H04L 12/28* (2006.01)
*H04W 4/38* (2018.01)
*H04W 4/021* (2018.01)

(52) U.S. Cl.
CPC ......... *H04L 12/2818* (2013.01); *H04W 4/021* (2013.01); *H04W 4/38* (2018.02)

(58) Field of Classification Search
CPC .. H04L 12/2818; H04L 12/2803; H04W 4/38; H04W 52/02
See application file for complete search history.

(56) References Cited

U.S. PATENT DOCUMENTS

| | | | |
|---|---|---|---|
| 2004/0103153 A1 | 5/2004 | Chang et al. | |
| 2014/0098247 A1 | 4/2014 | Rao et al. | |
| 2016/0321325 A1* | 11/2016 | Wang | G06F 16/93 |
| 2018/0191517 A1* | 7/2018 | Emigh | G06F 3/03547 |
| 2019/0004486 A1* | 1/2019 | Hall | F21V 33/00 |

* cited by examiner

*Primary Examiner* — Brandon J Miller
(74) *Attorney, Agent, or Firm* — Shuttleworth & Ingersoll, PLC; Jason Sytsma

(57) ABSTRACT

A device comprises of an AC input port for receiving AC power. An AC output port is adapted to receive an AC power cord of the home network device. A switch is provided for controlling the AC power to the home network device and switching the home network device between an on state and an off state. A processor is in communication with the switch for controlling the on state and the off state of the home network device in response to one of three predetermined conditions.

13 Claims, 5 Drawing Sheets

| Trust Level | Cellular | WiFi |
|---|---|---|
| 0 | OFF | OFF |
| 1 | ON | OFF |
| 2 | ON | ON – Listen Only |
| 3 | ON | ON – connect to WiFi |

US 10,608,836 B2

TAILORING THE AVAILABILITY OF NETWORK RESOURCES TO ON-DEMAND, USER PROXIMITY, AND SCHEDULE TIME

CROSS-REFERENCE TO RELATED APPLICATIONS

The present application claims the benefit of U.S. Provisional Application No. 62/654,612 filed Apr. 9, 2018, the contents of which are incorporated herein by reference.

TECHNICAL FIELD

This disclosure relates to a home network security device, and more specifically, this disclosure relates to a nominally off smart-switch-controlled network device.

BACKGROUND INFORMATION

The home environment contains an increasing number of connected Internet Protocol (IP) enabled wired and wireless devices. These internet connected devices, include smart TVs, security cameras, smart locks, gaming consoles, smart thermostats. With the explosion of the internet of things (IOT) virtually every new home appliance has the ability to connect to the internet. While this can be especially useful and convenient, all of these connected devices can make one especially vulnerable to hackers and other threats.

One of the best ways to secure a home network is to limit the time in which the network is on. By doing this, the threat vector service area of the network is narrowed and the time that the end users can have their activities monitored by $3^{rd}$ parties is limited. This reduces the window of ability for connected devices in the home to collect and report information, (i.e. spy), on the end user to only the time that the end user requires network services.

Typically, each device added to the home network requires the end user to accept the manufacturers' terms and conditions. These contractual requirements often include permission to monitor how the end user uses the equipment and to share that information with third parties. While the end user may user the device a few hours per week, the device "uses" the user twenty four hours per day.

By limiting the time the network is on also reduces the likelihood that connected devices in the home will be discovered and infected by worm/bot distributed viruses. It also decreases the threat vector service area of the end user network to malicious hacking attacks and reduces the opportunity for government agencies or any 3rd party to use network traffic, wired or wireless, to surveil end user activities to only the time that the end user requires network services, and limits the ability of non-authorized users to access the network to only the times that the end user desires network services.

Accordingly, there is a need for a device that provides user-control of the home network to keep the network nominally off except during user-defined conditions.

SUMMARY

In accordance with one aspect of the present invention, disclosed is a device for controlling a duration in which a home network device is on. The device comprises of an AC input port for receiving AC power. An AC output port is adapted to receive an AC power cord of the home network device. A switch is provided for controlling the AC power to the home network device and switching the home network device between an on state and an off state. A processor is in communication with the switch for controlling the on state and the off state of the home network device in response to one of three predetermined conditions.

The device can be configured responsive to three predetermined conditions comprising: (1) a geofencing area in which a user of the home network device resides wherein when the user is in the geofencing area the home network device is in the on state; (2) a scheduled time in which the home network device is in the on state; and (3) an on demand in which the home network device is in the on state. The device can be in communication with a mobile device that is associated with the user over a communication network for determining a geolocation of the user for determining whether the user is in the geofencing area. In such an instance, the device can be adapted to receive an on demand signal from the mobile device to switch the home network device to the on state. The device can be provided with memory for storing scheduled time instructions for the home network device in the on state. And, the switch for controlling the AC power to the home network device can be configured in a normally off state.

In one implementation, the device can include a geopositioning sensor for determining a location of the device. A communication network card for connecting the device to a communication network can also be provided. In some implementations, the preferred communication network is a cellular network. The device can also be provided with a network interface card for connecting the device to the home network device.

The device can be configured to communicate to the user (i) whether the home network device is in the on state, (ii) whether the home network device is connected to an internet service provider network, and (iii) whether the device is connected to the home network device over a home network provided by the home network device.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
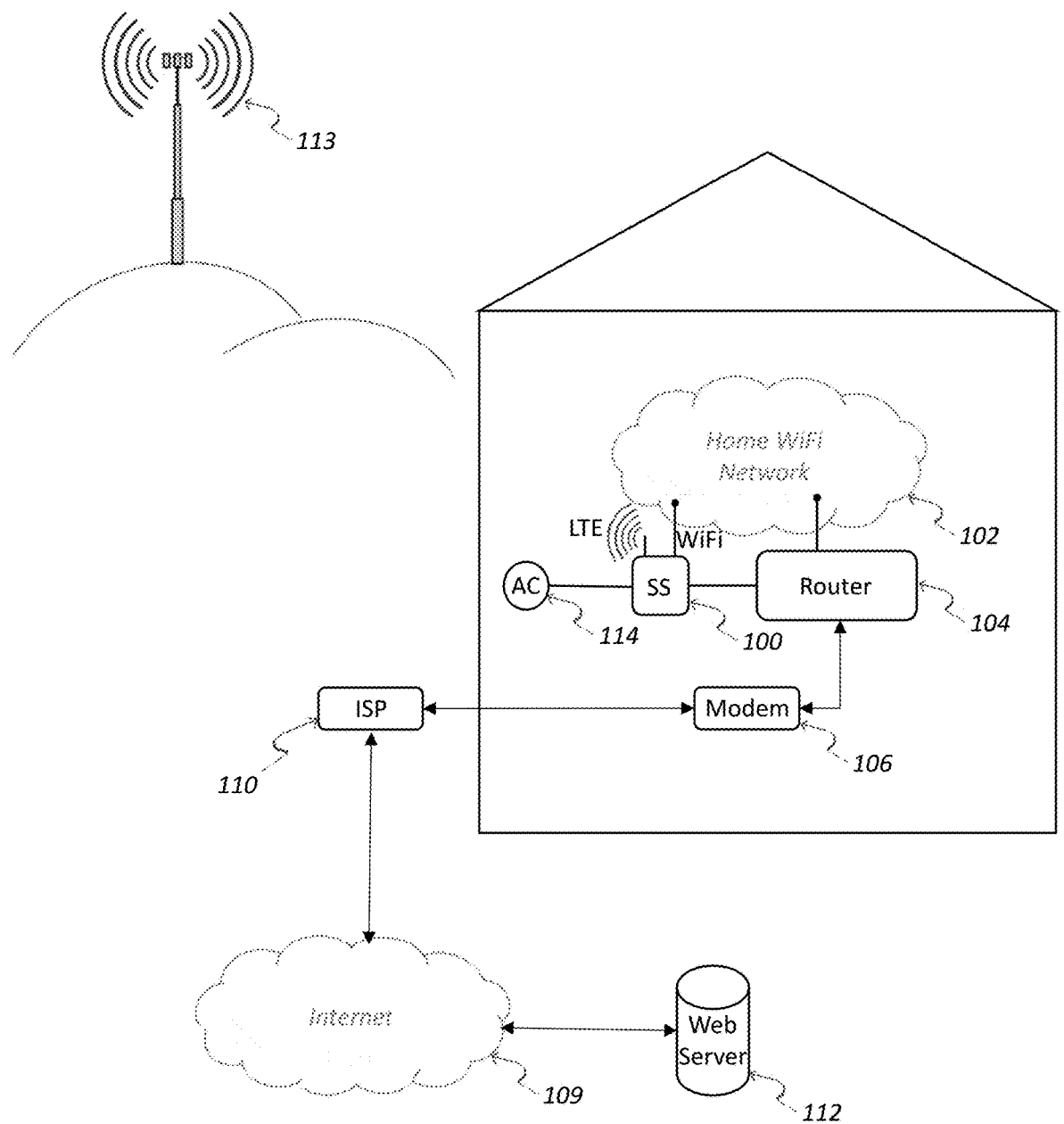
FIG. 1 is a detailed block diagram of a nominally off smart switch-controlled network with the telephony network connection.

Referring to FIG. 1, shown is a detailed block diagram of a nominally off smart switch-controlled network with the telephony network connection. In the home, the user may have one or more network devices connected to a home network 102 that connects to the internet 109 through a router 104 connected to a modem 106. The internet appliances can connect to router 104 in either a wired or wireless connection. Router 104 and modem 106 can be any type of network gateway, which acts as an entrance to the internet 109 through ISP 110, and may include devices such as a combination of a router and a high-speed modem, including a DSL modem and a cable modem, among others. Router 104 may be a stand-alone device or integrated into the high-speed modem 106.

One such appliance connected to home network 102 is a smart switch 100. Smart switch 100 is an electronic device configured with a network access system for connecting to internet 109 through router 104. Smart switch 100 is also configured with a cellular access system for connecting to a cellular network 113. In one implementation, smart switch 100 is connected between an AC power source 114 and an AC power cord for router 104 receiving AC power from AC power source 114 and providing AC power to router 104. In this configuration, smart switch 100 gives user-control over router 104 between an on state and an off state, which in turn disables home network 102.

Figure 2:
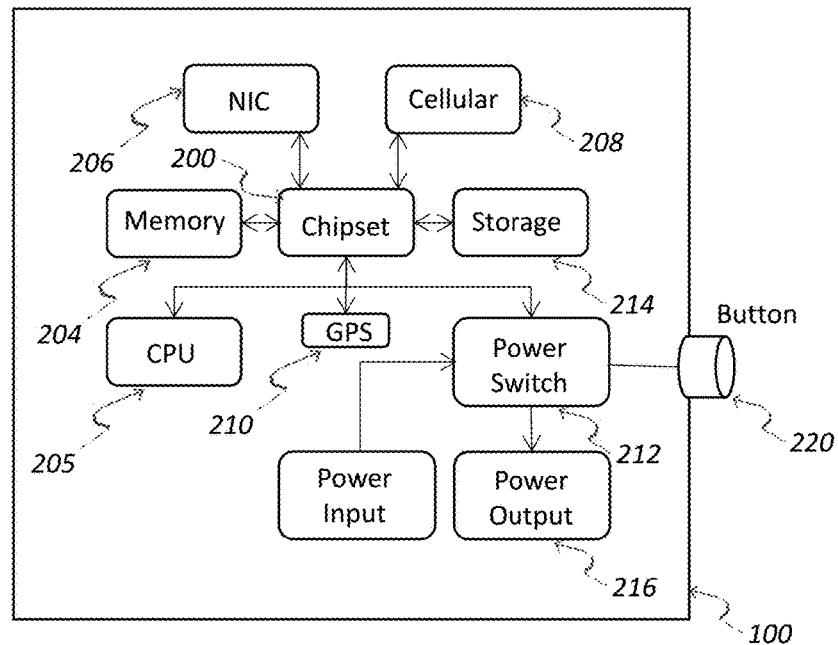
FIG. 2 is a detailed block diagram of the smart switch of FIG. 1.
Figure 3:
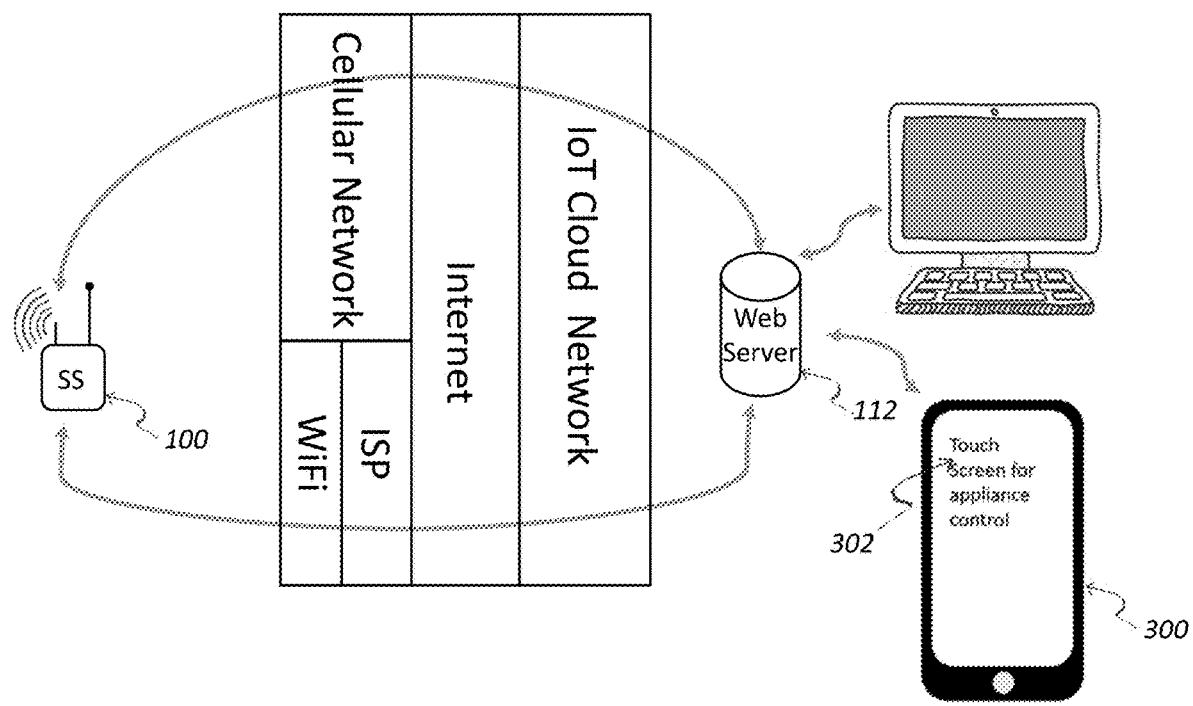
FIG. 3 shows a connection between the mobile device with interactive touch screen control for the smart switch of FIG. 1.

FIG. 2 shows smart switch 100. Smart switch 100 can comprise a chipset 200 comprising a processor 202, a system memory 204, network interface 206, a cellular chip 208 and one or more software applications and drivers to enable the functions described below. The hardware system includes a standard I/O bus with I/O Ports such as a GPS chip 210 a power switch controller 212 and mass storage 214 coupled thereto. GPS chip 210 could be used for determining and informing of the location of smart switch 100. This could be used as an extra layer of security to inform the user if smart switch is moved (which could be especially useful if smart switch 100 is implemented in router 104.

Elements of computer hardware system perform their conventional functions known in the art. In particular, network interfaces 206 are used to provide communication between a CPU 205 and the internet and cellular networks. Mass storage 312 can be used to provide permanent storage for the data and programming instructions to perform the above described functions implementing, whereas system memory 204 (e.g., DRAM) can be used to provide temporary storage for the data and programming instructions when executed by processor 205. CPU 205, it should be noted, may include a variety of system architectures, and various components of CPU 104 may be rearranged. Furthermore, certain implementations of the claimed embodiments may not require nor include all of the above components.

Power switch 217 is a normally open switch controlled by processor 205. Based on user-defined instructions, power switch 217 can be closed to permit the flow of AC power from AC source 114 to router 104. The specifics of these user-defined instructions will be discussed in more detail below.

Smart switch 100 can be use its cellular chip 208 to communicate with the user through a mobile device 300. Mobile device 300 can be any suitable mobile device that may communicate with cellular chip 208 in smart switch 100, such as a mobile phone, a tablet, or a laptop computer. As such, mobile device 300 can comprise a mobile application 302 that communicates with a webserver 112 (FIG. 1) for providing instructions to smart switch 100, such as one or more predetermined conditions for switching smart switch 100 to the on state to enable router 104. These predetermined conditions can include (i) a geofencing area in which a user of the home network device resides wherein when the user is in the geofencing area the home network device is in the on state; (ii) a scheduled time in which the home network device is in the on state; and (iii) an on demand in which the home network device is in the on state.

Figure 4:
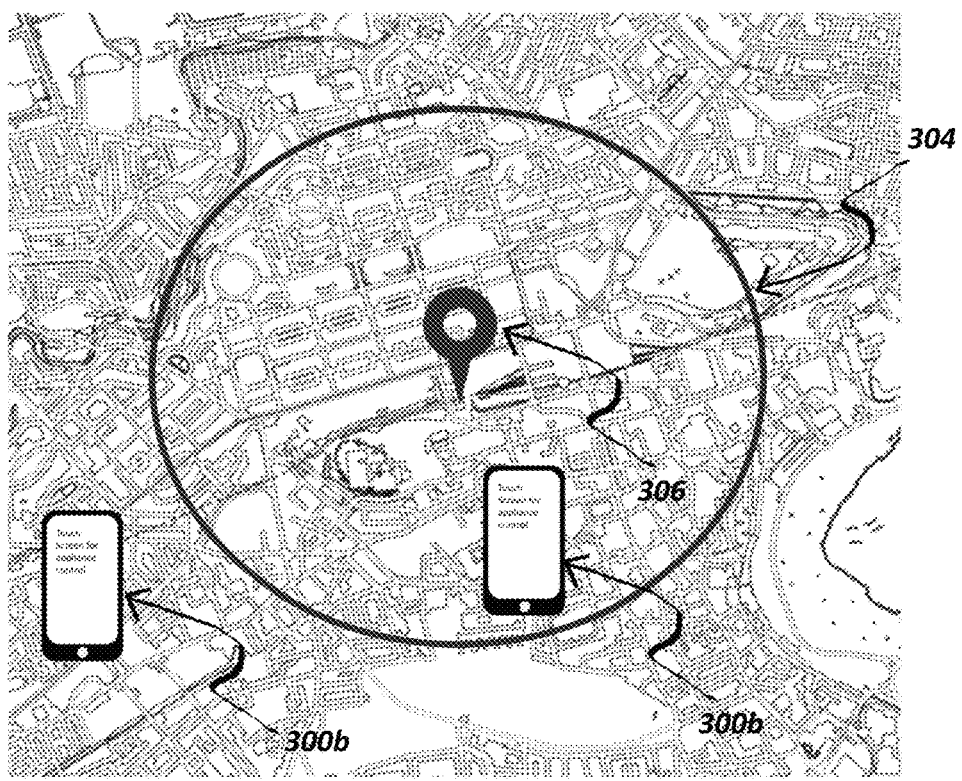
FIG. 4 shows an example of the network device control section on the interactive touch screen of the mobile device of FIG. 1.
Figure 5:
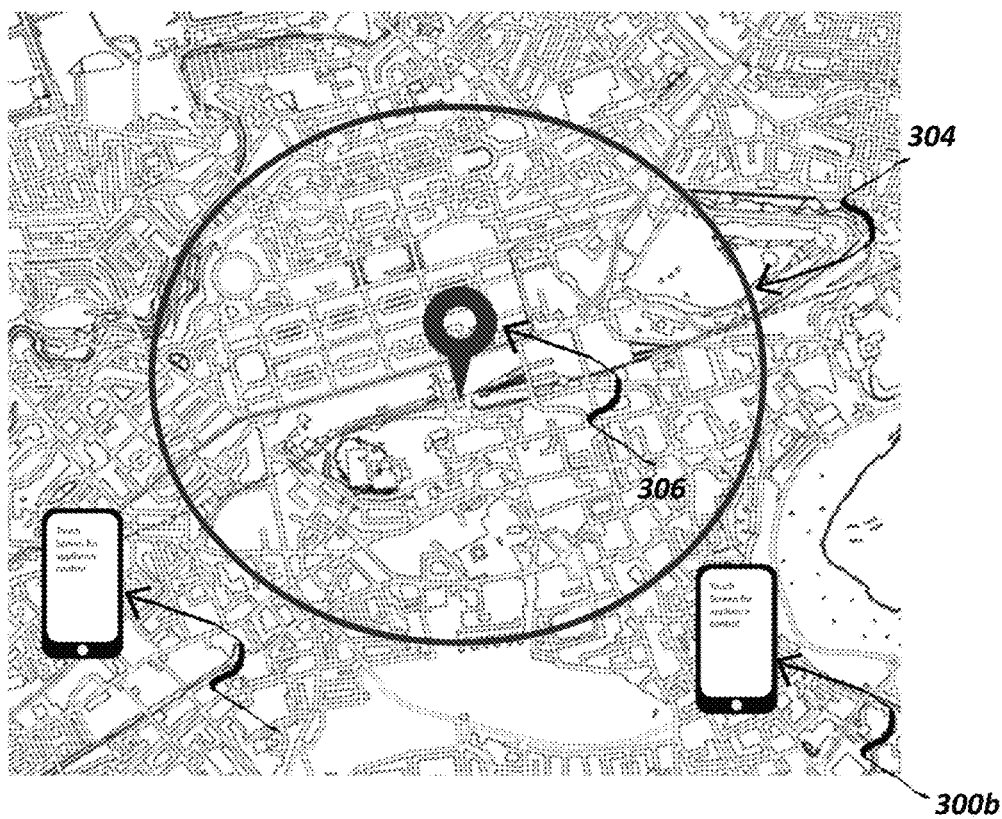
FIG. 5 shows another example of the network device control section on the interactive touch screen of the mobile device of FIG. 1.

FIGS. 4-5 show a display of the geofencing interface, which can be displayed on mobile device 300 or on a web interface or both. In this implementation, a geofence 304 is defined as a perimeter around the user's home 306. One or more mobile devices 300a, 300b associated with the user and family are associated with the network. When geofence 304 is empty, i.e. both mobile devices 300a, 300b are outside the perimeter as shown in FIG. 5, router 104 is off. This corresponds with a presumption that no one is at the home/office so the network is not needed. Conversely, when one or more of the associated mobile devices 300a, 300b are inside the perimeter, router 104 is on. The on/off trigger for this implementation can work in the following manner.

The location of smart switch 100 is roughly determined by one of three ways, by the cell tower it is connected to, the signal strength of the other cell towers it can "see", and by the identifiable WiFi networks it can "see". Smart switch 100 can be located in the center of geofence 304. Mobile application 302 can be configured to send updates to webserver 112 when mobile device 302 enters or leaves geofence 304. Webserver 112 can also be set up such that if the location/address entered by the user is inconsistent with the radius location data provided by the cellular carrier for the tower, the address is not accepted and the user will be prompted to correct the address. Webserver 112 can push the geofence data to mobile devices 300a, 300b when mobile application 302 registers with webserver 112 and if the geofence information changes (i.e. the appliance is moved). Mobile devices 300a, 300b send updates of their location to webserver 112 so that webserver 112 will notify smart switch 100 to turn off when all of the associated mobile devices 300a, 300b leave the perimeter of geofence 304, and, conversely, to turn on when one of the associated mobile devices 300a, 300b enters the perimeter of geofence 304.

Figures 6, 7:
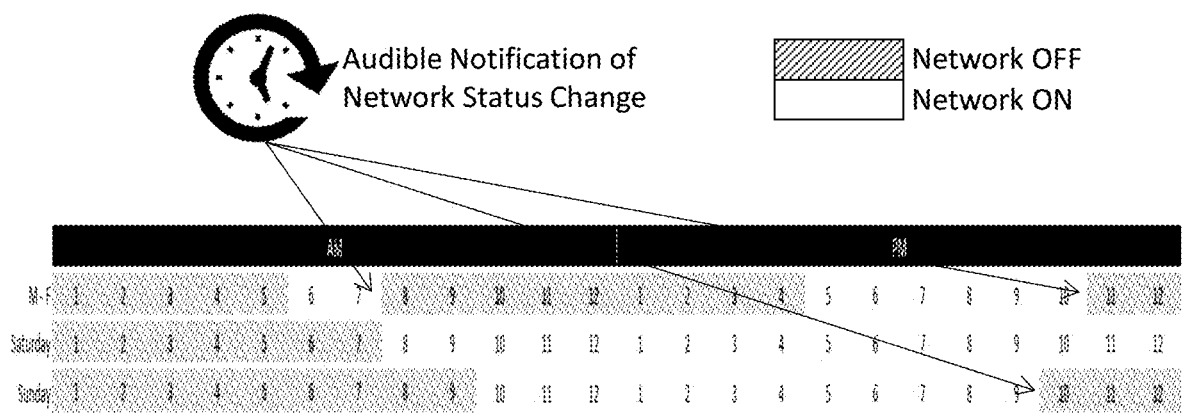
FIG. 6 shows yet another example of the network device control section on the interactive touch screen of the mobile device of FIG. 1.
FIG. 7 shows a trust level matrix for the network device control section on the interactive touch screen of the mobile device of FIG. 1.

FIG. 6 shows a scheduler implementation which can be presented by webserver 112 for the user to schedule the time in which router 104 is in the on state. In this implementation, the user can set the weekday hours and the weekend hours for router 104 to be in the on state and also set a warning notice to alert the user before router 104 switches states. One of the functions of the schedule timer is to keep router 104 off in the hours that the end user is sleeping. The appliance clock is set by the local cell tower via the same mechanism that sets the time on mobile device 300. Smart switch 100 disconnects the AC power to router 104 on/off at the appropriate times.

A short period prior to a scheduled switch of the power to router 104 to off, smart switch 100 can alert the end user with an audible chime and blinking lights. Additionally, any associated mobile device 300 inside of geofence 304 will also chime. The schedule switch to off can be suspended by the end user by pressing button 220 on smart switch 100 or on mobile application 302. If the end user suspends the scheduled switch to off, the scheduled switch to off can be ignored. The remainder of the schedule is unchanged, and this process will repeat with the next scheduled off period. These scheduling instructions can be stored in memory 204 of smart switch 100 or externally on webserver 112.

In another implementation, the user can change the status of the network in one or more of the three ways: 1) by pressing button 220 on smart switch 100, by (2) by selecting a virtual button on the web application, or (3) by selecting a virtual button on mobile device 300 running mobile application 302. The network can also be shut off through a digital assistant API (Google Home, Amazon Alexa, Apple Siri) or by audibly requesting "it's Off Hours".

Smart switch 100 performs at least three authentication functions. First, smart switch 100 can communicate to mobile device 300 whether router 104 is in the on state. This informs the user that yes, AC power is applied to router 104. Second, smart switch 100 can inform the user whether router 104 is connected to internet 109. Third, smart switch 100 can inform the user whether smart switch 100 is connected to router 104 through home network 102. This informs the user whether router 104 is broadcasting. All three authentication functions together provide valuable information to the user. Smart switch 100 effectively becomes a network sensor, tuned to the end user network (SSID & Network Credentials). Moreover, unlike other smart switches, smart switch 100 provides two-way communication over a communication network with both mobile device 300 and router 104 to provide the user with accurate information about the state of router 104.

FIG. 7 shows another implementation where the user can set a level of trust that limits ability of switch 100 to interact with home network 102 and with the outside world through out-of-band communications. Four levels of trust can be used. The lowest level prohibits all communications to and from switch 100, to the highest level where the user provides all network credentials to allow switch 100 to connect to home network 102. Trust levels act as follows:

Trust=0: Disables all communications from switch 100.

Trust=1: Enables out-of-band communications only; switch 100 does not connect to home network 102, which limits switch 100 to only confirm whether the AC power is switched to power output 216 so that router 104 is receiving AC power.

Trust=2: Out-of-band communications plus enables switch 100 to listen for a specific wireless network SSID from router 104 without connecting to home network 102, which tells the appliance the SSID to be monitored, but the system does not request the password, and switch 100 can notify the user when the SSID of router 104 begins broadcasting but cannot confirm that router 104 has successfully connected to the internet.

Trust=3: Out-of-band communications, plus permission to connect to home network 102, which enables switch 100 to report when power is applied to router 104, when the home network 102 becomes active, and when there is a connection to internet 109.

Figure 8:
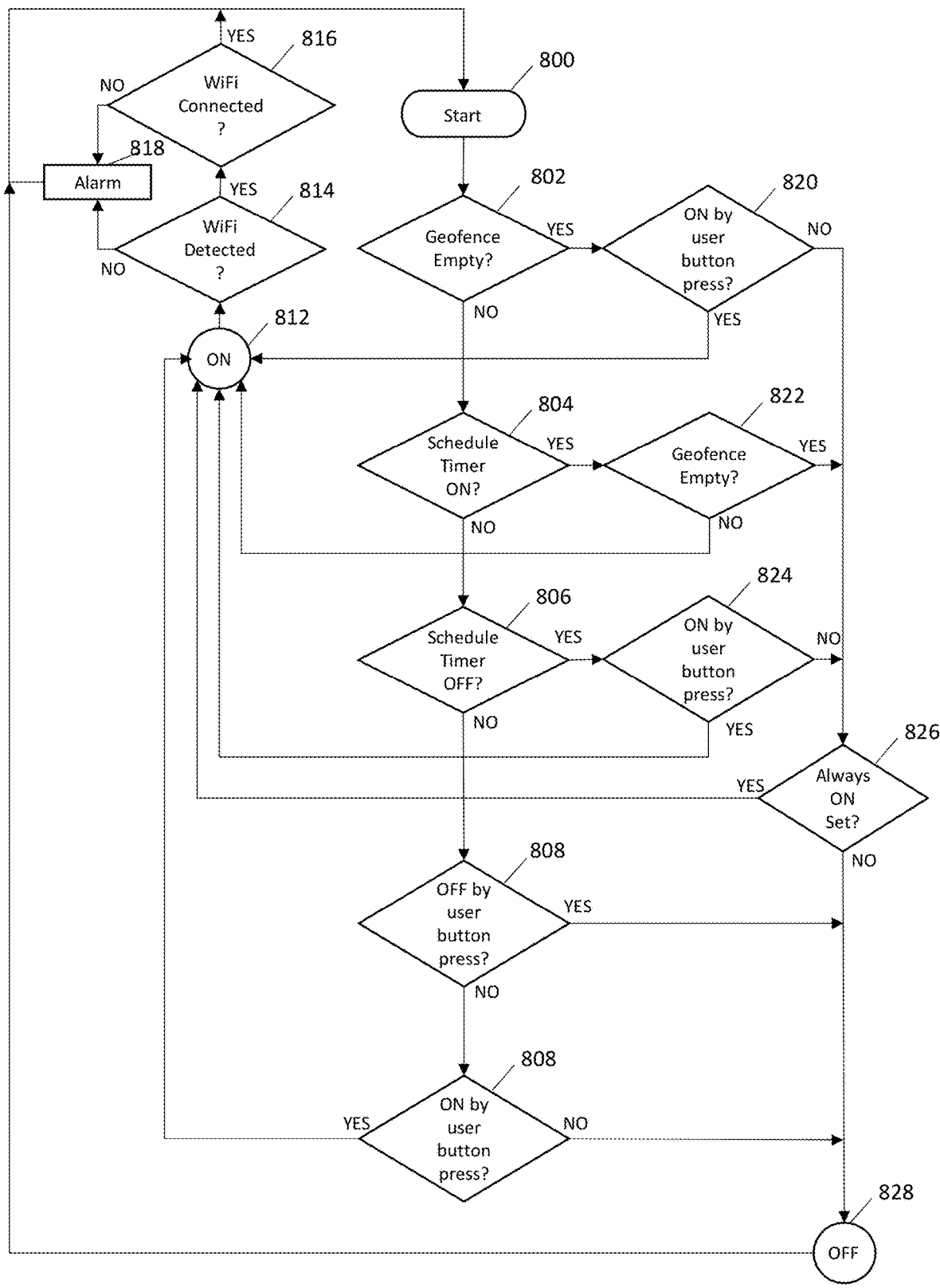
FIG. 8 shows a flow chart for the logic flow of the system.

FIG. 8 shows a flow chart for the logic flow of the system that implements smart switch 100. The method begins at 800 with a determination of whether the geofence is empty at step 802. If the geofence is not empty meaning that there is a mobile device 300 in geofence 304, the method proceeds to determine whether the schedule timer is on at 804, then whether the schedule timer is off at 806, and then whether button 220 is off at 808. If the determination of all of these steps is a negative and button 220 is on at determination step 810, router 104 is set to on at step 812. The method continues with determining whether the Wi-Fi is detected at step 814 and whether the Wi-Fi is connected at step 816. If the answer is in the affirmative for both steps 814 and 816, the method repeats. If the answer to either of these determinations is the negative, an alarm is sent in step 818, and then the method repeats. Returning to steps 802 through 806, if the answer to either of these determinations is these affirmative, the method continues with further determinations on whether to set router 104 to on at step 812. If the geofence is empty at step 802, the method progresses to determine whether button 220 is set to on at step 820. If the schedule timer is on at step 804, the method progresses to determine whether the geofence is empty at step 822. If the schedule timer is off at step 806, the method progresses to determine whether button 220 is on at step 824. If button 220 is set to off at steps 820 or 824 or the geofence is determined empty at step 822, the method progresses to determine whether the always on is set at step 826, and, if so, the method progresses to set router 104 on at step 812. On the other hand, if the answer is no, router 104 is set to off at step 828.

The foregoing system and method offers significant advantages over the prior art. By limiting the time that the network 102 is on, the time that mobile devices can "spy" on the end user is reduced to only when the user is on the mobile device. This is because the threat vector service area of the network is narrowed and the time that the end users can have their activities monitored by $3^{rd}$ parties is limited. Accordingly, the window of ability for connected devices in the home to collect and report information, (i.e. spy), on the end user is narrowed to only the time that the end user requires network services. Also, the likelihood that connected devices in the home will be discovered and infected by worm/bot distributed viruses is also reduced.

Those skilled in the art will recognize that one or more components of the systems and methods for switch 100 can comprise any collection of processor-based devices or computing devices operating together, or components of processing systems or devices, as is known in the art. The processing system switch 100 can include, for example, at least one processor and at least one memory device or subsystem. The processing system can also include or be coupled to one or more databases for receiving and storing data. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods herein described can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods of monitoring a subject in a premises and corresponding systems and methods include: microcontrollers with memory (such as electronically erasable programmable read only memory (EEPROM)), embedded microprocessors, firmware, software, etc. Furthermore, aspects of the systems and methods described herein may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

It should also be noted that mobile device 300 can be any of a number and/or combination of devices selected from among personal computers, personal digital assistants, portable computing devices, and portable communication devices, but is not so limited. The processing system can include components within a larger computer system.

Elements of computer hardware system perform their conventional functions known in the art. In particular, network interfaces 206 are used to provide communication between a CPU 205 and the internet and cellular networks. Mass storage 312 can be used to provide permanent storage for the data and programming instructions to perform the above described functions implementing, whereas system memory 204 (e.g., DRAM) can be used to provide temporary storage for the data and programming instructions when executed by processor 205. CPU 205, it should be noted, may include a variety of system architectures, and various components of CPU 104 may be rearranged. Furthermore, certain implementations of the claimed embodiments may not require nor include all of the above components.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A device for controlling a duration in which a home network device is on, the device comprising:
   an AC input port for receiving AC power;
   an AC output port adapted to receive an AC power cord of the home network device;
   a switch for controlling the AC power to the home network device and switching the home network device between an on state and an off state; and
   a processor in communication with the switch for controlling the on state and the off state of the home network device in response to one of three predetermined conditions, wherein the three predetermined conditions comprise:
   a geofencing area in which a user of the home network device resides wherein when the user is in the geofencing area the home network device is in the on state;
   a scheduled time in which the home network device is in the on state; and
   an on demand in which the home network device is in the on state.

2. The device of claim 1, wherein the device is in communication with a mobile device that is associated with the user over a communication network for determining a geolocation of the user for determining whether the user is in the geofencing area.

3. The device of claim 2, wherein the device is adapted to receive an on demand signal from the mobile device to switch the home network device to the on state.

4. The device of claim 3, and further comprising memory for storing scheduled time instructions for the home network device in the on state.

5. The device of claim 4, wherein the switch for controlling the AC power to the home network device is in a normally off state.

6. The device of claim 5, and further comprising a geo-positioning sensor for determining a location of the device.

7. The device of claim 6, and further comprising a communication network card for connecting the device to a communication network.

8. The device of claim 7, wherein the communication network is a cellular network.

9. The device of claim 6, and further comprising a network interface card for connecting the device to the home network device.

10. A device for controlling a duration in which a home network device is on, the device comprising:
   an AC input port for receiving AC power;
   an AC output port adapted to receive an AC power cord of the home network device;
   a switch for controlling the AC power to the home network device and switching the home network device between an on state and an off state; and
   a processor in communication with the switch for controlling the on state and the off state of the home network device in response to one of three predetermined conditions, wherein the device communicates to a user (i) whether the home network device is in the on state, (ii) whether the home network device is connected to an internet service provider network, and (iii) whether the device is connected to the home network device over a home network provided by the home network device.

11. A method for controlling a duration in which a home network device is on, the method comprising:
   receiving AC power from an AC input port;
   providing an AC output port for an AC power cord of a home network device;
   switching the home network device between an on state and an off state in response to one of three predetermined conditions;
   providing a device for switching the home network device between the on state and the off state; and
   communicating with the device to a mobile device that is associated with a user over a communication network for determining a geolocation of the user for determining whether the user is in a geofencing area; and wherein, receiving with the device an on demand signal from the mobile device to switch the home network device to the on state; and wherein, storing scheduled time instructions for the home network device in the on state.

12. The method of claim 11, and further comprising determining a location of the device with a geo-positioning sensor and connecting the device to a communication network.

13. A method for controlling a duration in which a home network device is on, the method comprising:
   receiving AC power from an AC input port;
   providing an AC output port for an AC power cord of a home network device;
   switching the home network device between an on state and an off state in response to one of three predetermined conditions; and
   communicating to a user (i) whether the home network device is in the on state, (ii) whether the home network device is connected to an internet service provider network, and (iii) whether the device is connected to the home network device over a home network provided by the home network device.

* * * * *